United States Patent [19]
Seligman et al.

[11] Patent Number: 4,934,300
[45] Date of Patent: Jun. 19, 1990

[54] VEHICLE PROPULSION APPARATUS AND METHOD OF OPERATION

[75] Inventors: Bruce H. J. W. Seligman, Surrey; Duncan H. Ferguson, Richmond, both of Canada

[73] Assignee: Watercraft Offshore Canada Ltd., Richmond, Canada

[21] Appl. No.: 219,305

[22] Filed: Jul. 15, 1988

[51] Int. Cl.$^5$ ............................................. B63H 11/107
[52] U.S. Cl. ..................... 114/270; 440/42; 440/46; 114/61
[58] Field of Search ............... 440/95, 38, 42, 46; 114/270, 61; 305/16, 15, 17, 25, 35 R, 35 EB, 39, 34, 54, 60; 180/9.1, 9.4, 9.42, 9.44, 9.62

[56] References Cited

U.S. PATENT DOCUMENTS

| | | | |
|---|---|---|---|
| 1,298,366 | 3/1919 | Macfie | 440/95 |
| 1,298,367 | 3/1919 | Macfie | 180/9.32 |
| 2,894,476 | 7/1959 | Lindgren | 440/95 |
| 3,302,605 | 2/1967 | Kuether | 440/42 |
| 3,382,943 | 5/1968 | Anderson | 180/9.1 |
| 3,610,708 | 10/1971 | Muecke | 305/35 EB |
| 3,696,878 | 10/1972 | Nelson | 180/9.46 |
| 3,760,763 | 9/1973 | Brusacoram | 115/1 R |
| 3,774,979 | 11/1973 | Harris | 305/35 EB |
| 3,842,785 | 10/1974 | Rivet | 115/1 R |
| 3,951,093 | 4/1976 | Poche | 115/1 R |
| 4,645,023 | 2/1987 | Rea et al. | 180/9.32 |
| 4,652,244 | 3/1987 | Drury | 440/42 |
| 4,727,949 | 3/1988 | Rea et al. | 180/9.32 |

OTHER PUBLICATIONS

Brochure of Watercraft Offshore Ltd., pub. prior to 7/15/87.
Brochure entitled "Hagglunds Carrier" and All Terrain Carrier for Cross Country Mobility, prior to 7/15/87.
Brochure, "The Swamp Belongs to Kori", published prior to 7/15/87.

Primary Examiner—Sherman D. Basinger
Assistant Examiner—Edwin L. Swinehart
Attorney, Agent, or Firm—Bull, Housser & Tupper

[57] ABSTRACT

The invention provides a crawler track belt assembly with flexible parallel belts interconnected by transverse grouser bars. The bars have guide portions spaced transversely apart and mutually aligned longitudinally with guide portions of other bars. A track bed of the vehicle has parallel, longitudinally extending, guide grooves which receive and guide the guide portions of the belt to maintain track alignment. To reduce belt tension, the lower track bed has a lateral profile which resembles a catenary. The vehicle body has spaced sponsons defining a hull tunnel therebetween, and in water is powered by a water jet having a primary intake adjacent the tunnel roof. If the primary intake becomes blocked, a secondary intake on the track bed is swept by the crawler track belt assembly to maintain the secondary nozzle free of obstruction. The water jet discharges through a rotatable nozzle which can be directed to assist in clearing the primary intake of blockage.

27 Claims, 5 Drawing Sheets

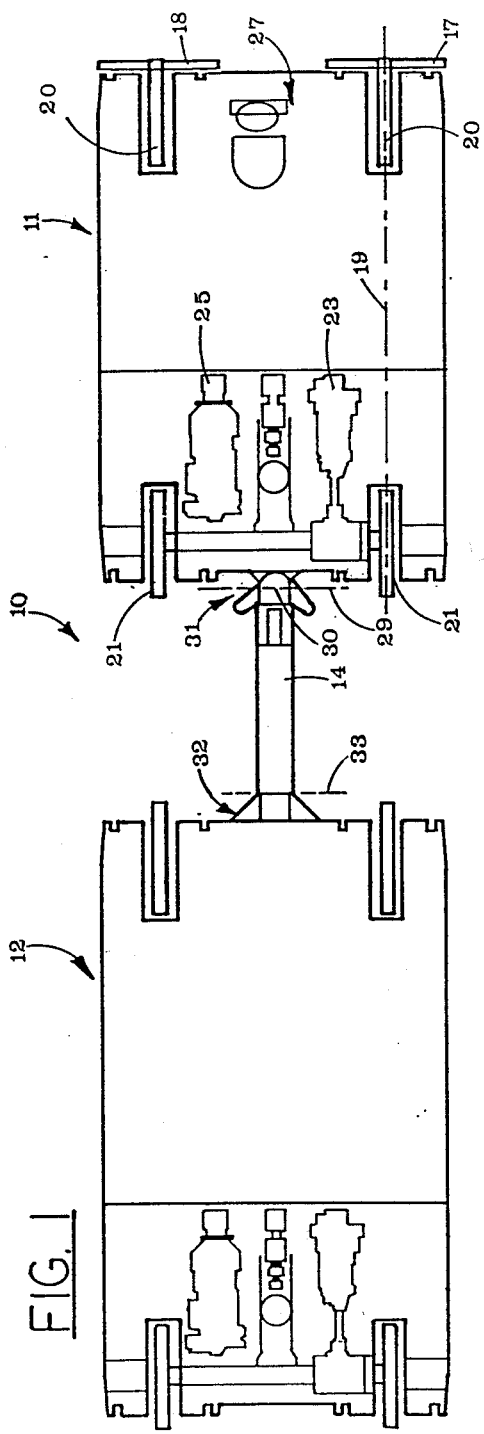
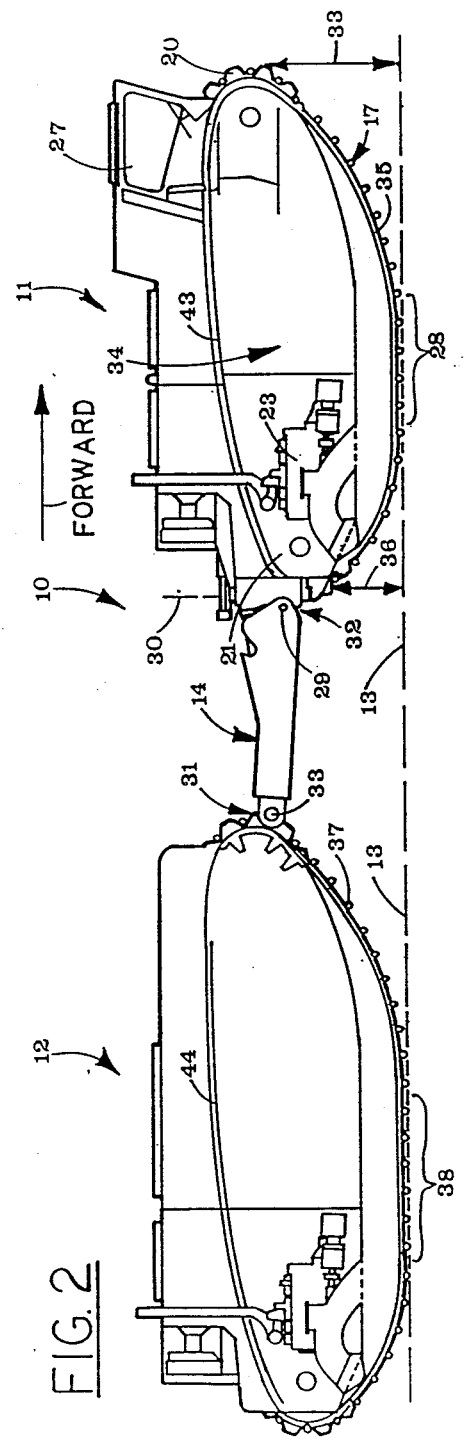

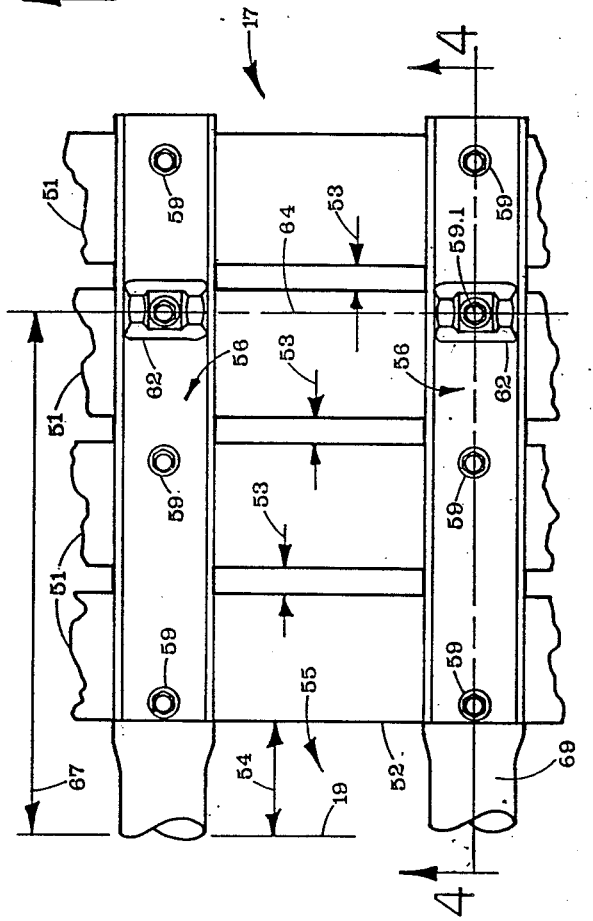

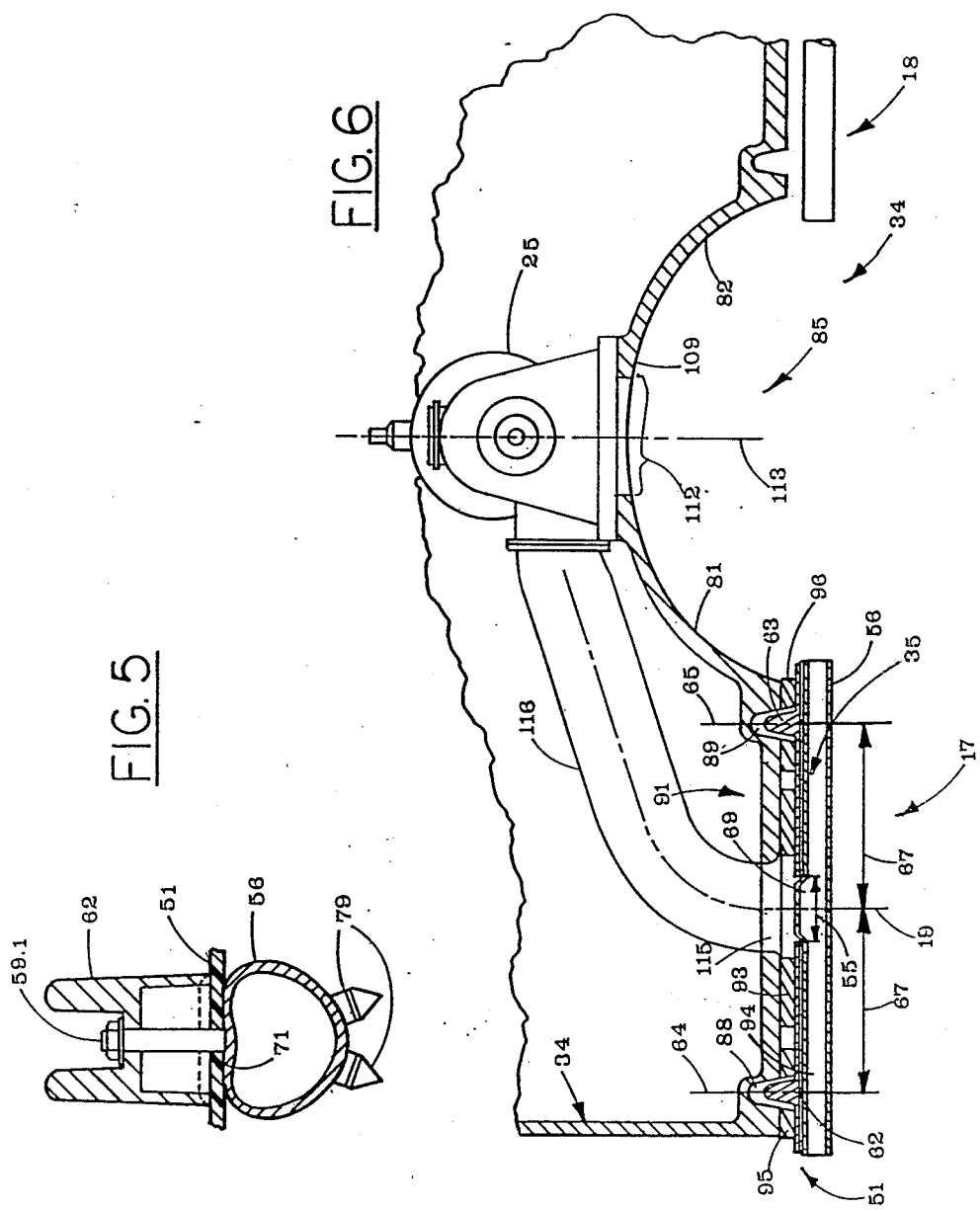

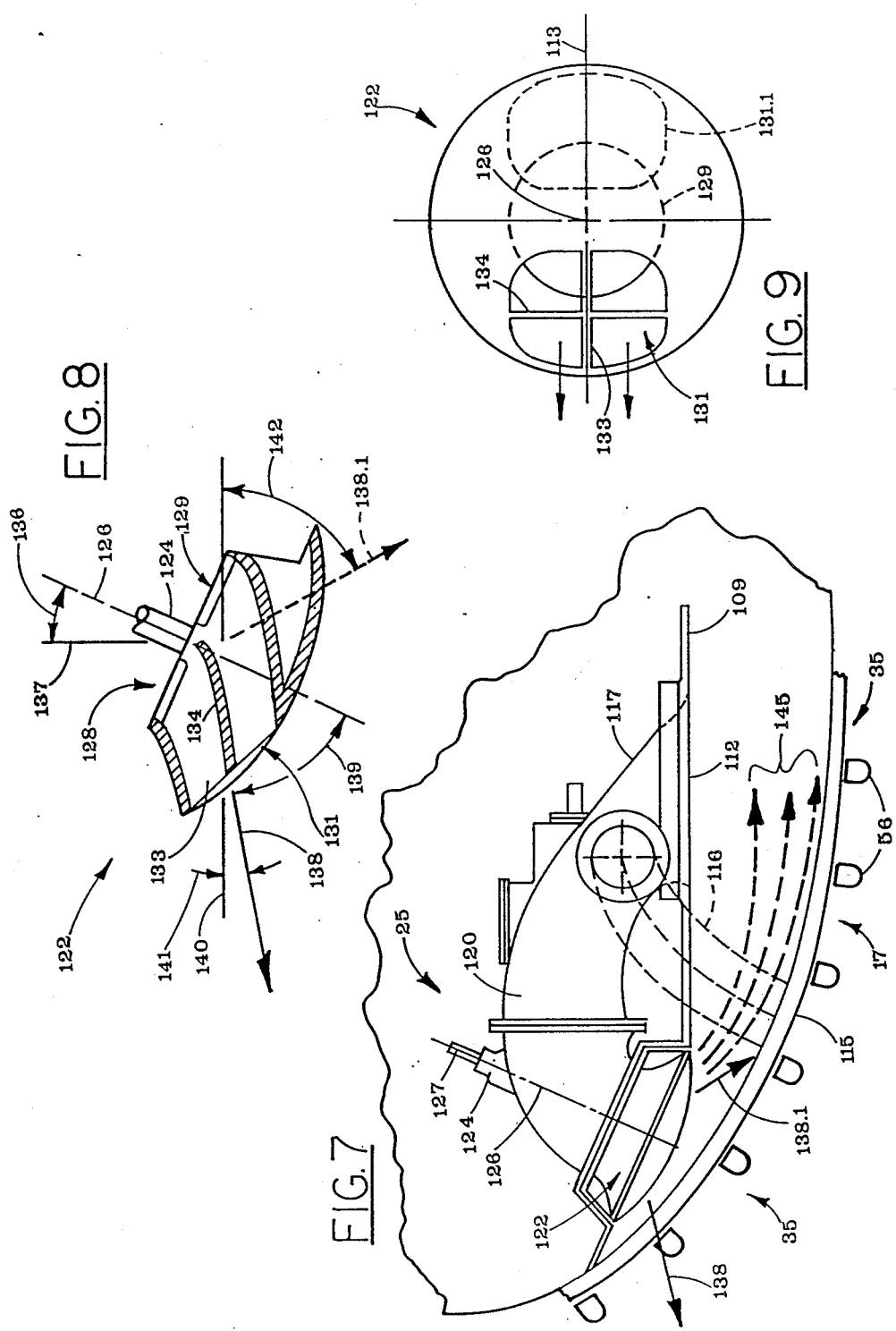

VEHICLE PROPULSION APPARATUS AND METHOD OF OPERATION

BACKGROUND OF THE INVENTION

The invention relates to propulsion apparatus for an all terrain vehicle, particularly a crawler track amphibious vehicle adapted to traverse marginal terrain and water as found in polar regions.

The present applicant has U.S. Pat. Nos. 4,645,023 and 4,727,949 which relate to an all terrain vehicle and method of operating same respectively, which are closely related to that present invention. Similarly to the patented vehicle, the present invention is a vehicle combination having first and second vehicle units interconnected by an articulated link. Each vehicle unit has a pair of spaced crawler tracks which, in combination with the articulated link, permit the vehicle combination to perform maneuvers for negotiating steep and marginal terrain, including water and ice, which would normally not be negotiable by a single vehicle unit of this type.

Each patented vehicle unit has body portions provided with forward and rear sprockets which engage the crawler tracks to power the vehicle. Lower portions of the body have generally flat centre sections and flat upwardly extending forward and rear body portions which terminate adjacent the forward and rear sprockets. The generally flat center portion of the body carries a plurality of free-wheeling track rollers which engage the track and reduce friction between the crawler track and body. In certain situations, difficulties can arise in maintaining track alignment with the rollers engaging lower portions of the tracks. Also, in marine applications, corrosion of the track rollers is a problem.

All track laying vehicles known to the applicant usually have a lower portion of the body provided with a generally flat central portion, with flat, upwardly extending forward and rear portions which resemble those shown in the patented vehicle. A problem common to all track laying vehicles is the working life of the crawler track assembly itself. Metal link chains, in which a plurality of links are inter-connected by link pins, wear excessively in abrasive conditions, such as found when traversing swamps, muddy or sandy areas, etc. Furthermore, such metal tracks, particularly when used in the salt water, corrode rapidly. Many different types of track belt assemblies have been used to overcome these problems, such as strips of so-called rubber belt material.

It is important that the crawler tracks maintain alignment with the sprockets during operation of the vehicle, so that the track is not "thrown" from the sprockets. The ability of a track to run on its sprockets is termed "track stability" or "track alignment" and, in general, the higher the track tension, the higher the track stability. Track tension is the tensile force in the track or belt that is applied by moving one of the sprockets relative to the other sprocket to apply a sufficiently high load on the track to maintain the track running aligned on the sprockets. For most types of crawler track assemblies it is known that track tension is a major contributor to wear of the tracks, irrespective of all the other factors contributing to crawler track assembly wear. Furthermore, high track tension consumes more power from the power train than low track tension, and thus reduces overall efficiency of operation of the vehicle. If a means of reducing track tension can be found, operating efficiency and life of the track assembly will be increased.

U.S. Pat. No. 3,842,785 (Rivet) discloses an amphibious marsh craft in which lower runs of crawler tracks are guided in channels extending longitudinally along a lower surface of a pair of spaced apart sponsons, thus eliminating the more normal track rollers. This vehicle is designed for marsh use, and it would appear that the crawler tracks are the only mode of propulsion. Because conventional crawler tracks perform very inefficiently in water, conventional amphibious track-laying vehicles commonly have an auxiliary marine propeller fitted for water use. However, propeller-powered vehicles used in polar regions are vulnerable to propeller damage due to ice contact. A water jet can be substituted to reduce this problem, but a water jet powered vehicle used in very low temperatures is susceptible to ice blocking the intake of the water jet, preventing further operation until the blockage has been cleared.

SUMMARY OF THE INVENTION

The invention reduces difficulties and disadvantages of the prior art by providing, among other improvements, a crawler track apparatus for a vehicle in which track tension can be reduced. The invention also eliminates rollers, and instead provides track guides which maintain track alignment between the vehicle and the crawler track assembly itself. In particular, the guides improve track stability when the vehicle is traversing a side slope or turning sharply to the side. Also, track tension is reduced by eliminating the flat centre section of the body portions and substituting a new lateral track profile. Furthermore, the apparatus also provides a means of essentially eliminating blockage on an intake for a water jet by maintaining the water jet intake free of debris by sweeping it with the crawler track assembly.

The propulsion apparatus according to the invention has a crawler track belt assembly comprising a plurality of belt portions and grouser bars. The belt portions are elongated and longitudinally extending and are disposed parallel to each other, and the grouser bars are longitudinally spaced apart and extend transversely across and are secured to the belt portions. At least some of the grouser bars mount guide portions at respective stations which are spaced transversely apart with respect to the belt assemblies so that the guide portions of a respective station are mutually aligned longitudinally with each other.

Preferably, each grouser bar mounts a plurality of spaced apart guide portions which project from respective stations adjacent to a side of the bar which is adjacent to the belt portion. The guide portions of each bar are spaced apart from each other along the bar so that the guide portions of the bars are mutually aligned longitudinally with each other. The vehicle body has a crawler track bed having a plurality of parallel, longitudinally extending, laterally spaced apart guide grooves. The grooves are located at laterally spaced apart stations on the body at a spacing generally equal to spacing between adjacent stations of the guide portions of the crawler track belt assembly. In this way, the guide portions of the grouser bars are received in the grooves of the body so as to maintain track alignment during relative movement between the vehicle body and the crawler track assembly.

Preferably, in order to reduce track tension, the lower portion of the crawler track bed has a profile when viewed laterally of the vehicle that resembles a catenary. The vehicle body has rotatable forward and rear sprockets which engage the grouser bars of the crawler track assembly and are positioned adjacent forward and rear ends respectively of the profile which resembles the catenary.

An amphibious embodiment of the invention is powered by a water jet which has an intake located in the track bed so as to be swept by the crawler track belt assembly as the vehicle moves. The amphibious embodiment of the vehicle has lower portions of the vehicle body having a pair of generally similar sponsons which are spaced laterally apart to define a hull tunnel therebetween. The hull tunnel has a longitudinally extending roof defining a central portion of the lower portion of the body, and a primary intake for the water jet is positioned adjacent to the roof. The sponsons have respective lower surfaces to provide crawler track beds for lower runs of the track assemblies, and a secondary intake for the water jet is mounted in at least one of the track beds so as to be swept by the respective crawler track assembly due to relative movement between the track assembly and the vehicle, thus essentially preventing build-up of debris in the intake. A discharge nozzle of the water jet can be swung to direct water under pressure to assist in clearing debris adjacent the primary intake.

A detailed disclosure following, related drawings, describes preferred structure and method of the invention, which is capable of expression in structure and method other than those particularly described and illustrated.

DESCRIPTION OF THE DRAWINGS

FIG. 1 is a simplified top plan view of an articulated vehicle combination which is particularly adapted to for use with the present invention, and has many similarities with the present applicant's U.S. Pat. No. 4,645,023, FIG. 2 is a simplified side elevation of the articulated vehicle combination of FIG. 1, showing some aspects of the invention, FIG. 3 is a simplified fragmented bottom plan view of a portion of a crawler track belt assembly according to the invention, showing a pair of grouser bar portions, FIG. 5 is a simplified fragmented section on line 5—5 of FIG. 4 showing adjacent portions of a guide portion and grouser bar assembly, FIG. 6 is a simplified fragmented transverse section as viewed rearwardly through a stern portion of the vehicle body showing portions of a water jet and primary and secondary intakes, many portions being omitted for clarity, FIG. 7 is a simplified fragmented longitudinal section through the stern portion of the vehicle, showing portions of a water jet assembly, including intakes and a discharge nozzle thereof, FIG. 8 is a simplified fragmented longitudinal section through a portion of the nozzle shown inclined rearwardly, generally as shown in FIG. 7, FIG. 9 is a simplified bottom plan view of the nozzle of FIG. 8, as viewed along an axis of rotation of the nozzle.

DETAILED DISCLOSURE

FIGS. 1 and 2

Figure 4:
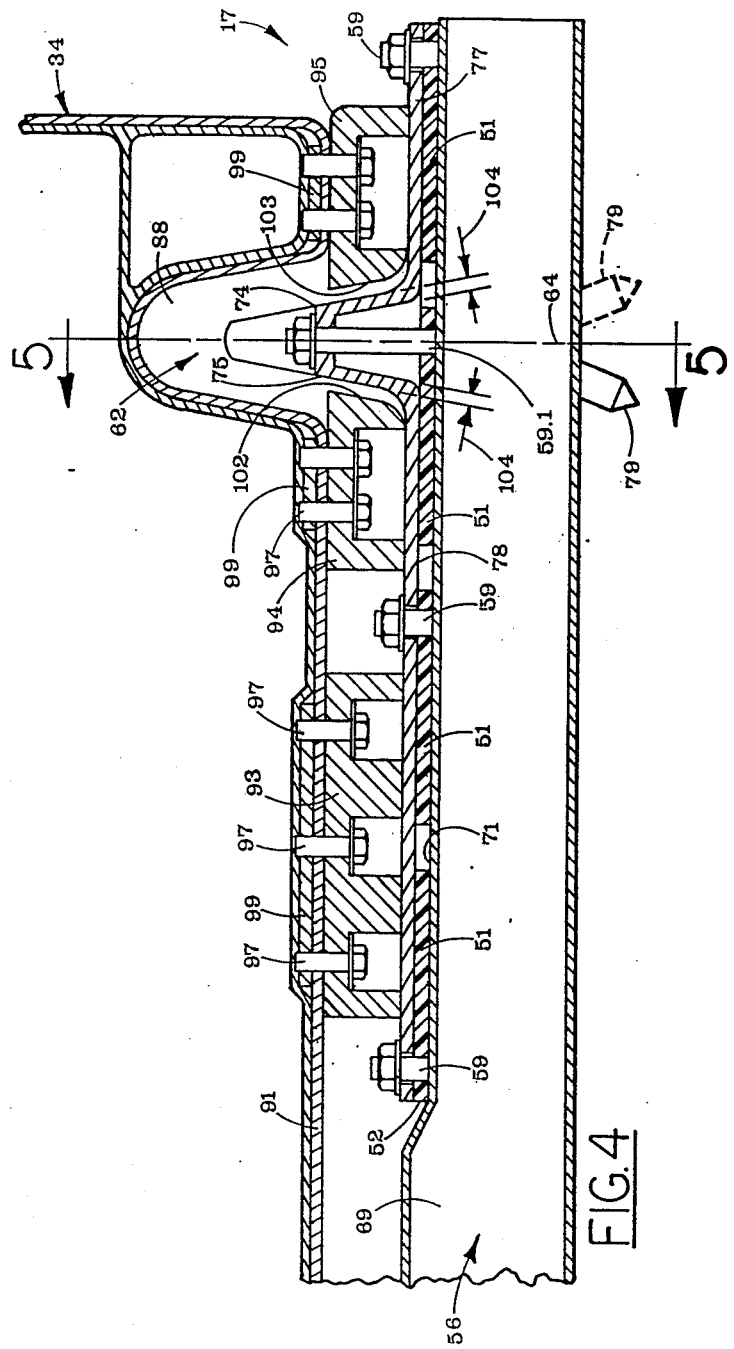
FIG. 4 is a simplified longitudinal section through a portion of one grouser bar portion, as seen looking forwardly on line 4—4 of FIG. 3, the belt assembly being shown cooperating with a portion of a vehicle crawler track bed.

An articulated vehicle combination 10 equipped with the present invention is shown supported on a hard surface 13 and has first and second vehicle units 11 and 12 interconnected by an articulating link assembly 14. The first and second vehicle units have many similar components and features, and thus the first vehicle unit only will be described in some detail.

The vehicle unit 11 has first and second crawler track belt assemblies 17 and 18 which pass around respective pairs of forward sprockets 20 and rear sprockets 21. The crawler track belt assembly 17 has a central longitudinal axis 19 which extends between central vertical planes of the respective forward and rear sprockets 20 and 21 as best seen in FIG. 1. The pair of rear sprockets 21 are powered by a power unit 23 so as to draw the vehicle along the tracks as is common practice, the power unit 23 also powering a water jet assembly 25 for amphibious use. A crew cab 27 houses operating personnel and controls, and additional personnel, payload, etc. can be carried within the interior of the vehicle or externally thereof.

The articulating link assembly 14 has longitudinally spaced, forward and aft hinge assemblies 31 and 32 connected to the vehicle units 11 and 12 respectively. Means are provided in the assembly 14 and associated structure, not shown or described, which permits the forward vehicle unit 11 to be forcibly rotated with respect to the link assembly 14 so as to pitch the vehicle unit 11 upwards or downwards with respect to the link assembly 14 about a horizontal axis 29 to negotiate steep terrain. Also, for steering purposes, the first vehicle unit can be rotated about a vertical axis 30 with respect to the link assembly 14. The vehicle unit 12 is freely rotatably connected to the hinge assembly 31 so as to permit free movement of the unit 12 about a horizontal axis 33 with respect to the link.

The structure described above generally resembles that shown in applicant's U.S. Pat. No. 4,645,023. The patented vehicle has been shown to be capable of traversing many different types of terrain, in particular severe marginal terrain such as a combination of steep immobile or land-fast ice, floating ice, and open water, and transitions therebetween.

The present invention enhances performance of this general type of vehicle by incorporating distinct structural differences from the said patent, thus permitting the vehicle to operate more efficiently in severe terrain, and simultaneously reduces wear of some major components of the vehicle.

In contrast with the vehicle of the reference, the vehicle unit 11 comprises a body 34 having a lower track bed portion 35 which has a profile when viewed laterally of the vehicle unit that resembles a catenary. When a uniform, perfectly flexible, i.e. ideal, link is hung from two horizontally spaced points, the profile of the link forms a catenary. In the present invention, the link, while not being ideal, has a plurality of flexible elastomeric belt portions which permit the link, when supported by two horizontally spaced points, to assume a profile that approximates to or resembles a catenary. In the particular instance, the forward and rear sprockets, which engage the crawler track assembly, are positioned adjacent forward and rear ends respectively of the profile which resembles the catenary. In practice, the crawler-belt assembly engages the sprockets on the pitch circle thereof, not shown, and thus the pure catenary is not attained. Nevertheless, track tension can be reduced by ensuring that, in general, the lower portion of the track bed closely approximates to a catenary.

It is noted that the forward portion of the track bed rises upwardly and forwardly to a greater height 33 than height 36 of a corresponding rear portion of the track bed. This height difference improves climbing ability of the vehicle combination, and reduces drag when travelling in water. Also, when resting on the hard surface 13, only a small inner portion 28 of the track bed is in direct engagement with the surface 13. The forward vehicle unit 11 would thus have a tendency to roll easily forwardly and backwardly about a horizontal axis unless it were restrained against such rolling by the articulating link assembly 14 and the unit 12.

The rear unit 12 similarly has a lower track bed portion 37 having a profile when viewed laterally of the unit which resembles a catenary, although the unit 12 is longer than unit 11 and has an elongated inner portion 38 which distorts the profile somewhat from the more ideal catenary profile of the unit 11. The inner portion 38 is relatively flat, and accommodates additional length of the vehicle unit without any corresponding rise in the overall height of the vehicle that would otherwise be necessary if the track bed 37 of the vehicle 12 were to be closer to a catenary. Nevertheless, reduced track tension is attained even with the very approximate catenary form of the track bed 38.

The first and second vehicle units 11 and 12 have respective upper track bed portions 43 and 44 which carry upper runs of the corresponding crawler track belt assemblies. It can be seen that the upper track bed portions extend smoothly between the respective forward and rear sprockets as in conventional track laying vehicles.

FIGS. 3 through 6

As best seen in FIG. 3, the crawler track belt assembly 17 has a plurality of elongated, longitudinally extending, flexible belt portions 51 disposed parallel to each other, and to the central longitudinal axis 19 of the belt assembly. As is common practice, ends of each belt portion are joined to each other to form a plurality of laterally spaced, equal length, endless loops of belt. One-half of the belt assembly 17 only will be described with reference to FIGS. 3–5, the other half being shown partially only in FIG. 6 and being generally similar.

In the example described, one-half of the belt assembly 17 has four belt portions 51 which are fabricated from a tough, fabric-reinforced, flexible belt material, generally similar to that used on so-called rubber-belted vehicles. The belt portions are conventionally spliced to form respective continuous loops, and have sufficient strength to withstand track tension, and severe operating conditions and low temperatures encountered particularly in polar travel. The belt portions 51 have equal widths, and are spaced apart by a lateral spacing 53 from each other. An inner edge 52 of an inner belt portion is spaced by a lateral spacing 54 from the axis 19, which spacing 54, plus a corresponding spacing on an opposite portion of the belt, provides a gap 55 sufficient to accommodate a sprocket tooth of the sprockets 20 and 21, as shown in FIG. 6 only.

The belt assembly further includes a plurality of longitudinally spaced apart grouser bars 56 (FIG. 3) which extend transversely across the belt portions and are secured to the belt portions by a plurality of fasteners, generally 59. As seen best in FIG. 4, the fasteners 59 for one-half of the grouser bar 56 include three relatively short studs 59 provided with corresponding nuts and washers, and a relatively long stud 59.1 with corresponding nuts and washers as will be described.

As seen in FIG. 6, the grouser bar 56 mounts outer and inner guide portions 62 and 63 at respective outer and inner stations 64 and 65 which are spaced transversely apart with the respect to the belt assembly. The stations 64 and 65 are spaced apart at equal distances 67 from the central longitudinal axis 19 of the belt. A central portion 69 of the grouser bar located adjacent the gap 55 of the belt assembly at the axis 19 is cylindrical in cross section. While the grouser bar is generally cylindrical, as best seen in FIGS. 4 and 5, it has a generally flat face 71 on each side of the portion 69 which is in contact with the belt portions 51. Thus the central portion 69 of the bar is disposed between a pair of adjacent flat faces 71 and is cylindrical to engage smoothly teeth to the drive sprockets 20 and 21 (FIGS. 1 and 2).

As seen in FIGS. 3 and 6, the guide portions 62 and 63 project from the respective stations 64 and 65 adjacent a side of the bar which is adjacent the belt portion. The guide portions of each grouser bar are spaced apart from each other along the bar and are positioned so as to b ⓡaligned longitudinally with guide portions of the other bars. It is noted that, in the example illustrated, each bar has two guide portions. In practice, it would not be necessary for each bar to have one or two guide portions and, depending on spacing between the bars, some bars without guide portions could alternate with bars with guide portions. Furthermore, one grouser bar could have a guide portion at one station, and an adjacent or other bar could have a guide portion at another station. Whichever combination of bars is used and whether the bars have one or more guide portions each, it is important that all the guide portions of a respective station are mutually aligned longitudinally with each other for the purpose of engaging guide grooves in the track bed, as will be described.

The guide portions 62 and 63 are essentially similar, and thus only the guide portion 62 will be described in detail. As seen in FIGS. 4 and 5, the guide portion 62 of the grouser bar has longitudinally aligned side faces 74 and 75 which converge towards each other from the grouser bar to define a tapered cross-sectional shape when viewed longitudinally of the crawler belt track, that is along the axis 19. The guide portion 62 has mounting flanges 77 and 78 extending smoothly outwardly therefrom and have openings to receive the fasteners 59 and to secure the flanges to the generally flat faces 71 of the grouser bars. A longer recessed central portion of the guide portion receives the long stud 59.1. It can be seen that the belt portions 51 are sandwiched between the mounting flanges 77 and 78 and the grouser bar 56. The mounting flanges 77 and 78 serve as wear strips which sandwich a portion of the belt between the wear strip and the grouser bar to resist wear from relative movement between the belt and vehicle body as will be described. The belt portion also provides a resilient suspension between the vehicle body and the grouser bar itself, so as to reduce shock loads and vibration transmitted through the grouser bar to the body. A pair of a laterally inclined spikes 79 extend downwardly from the bar 56 generally immediately below the guide portion 62. The spikes of successive grouser bars are staggered laterally so that a spike of a following grouser bar does not contact exactly the same portion of the surface previously contacted by an immediately leading grouser bar, thus essentially avoiding continuous sweeping of the same area of the surface with the spikes of following grouser bars.

As seen in FIG. 6, a lower portion of the vehicle body 34 has first and second generally similar sponsons 81 and 82 which are laterally spaced apart to define a hull tunnel 85 therebetween. The sponson 81 has a lower surface which serves as the lower track bed 35 to cooperate with the lower run of the crawler track belt assembly 17. The crawler track bed 35 has first and second parallel, longitudinally extending, laterally spaced apart, guide grooves 88 and 89. The grooves 88 and 89 are located at the laterally spaced apart stations 64 and 65 respectively at a spacing equal to spacing between adjacent stations of the guide portions 62 and 63 respectively of the crawler track belt assembly. The grooves receive the respective guide portions therein to guide the vehicle body on the grouser bars of the crawler track assembly as the vehicle moves. As the guide grooves are essentially similar, only the guide groove 88, associated track bed portion and the adjacent belt assembly portion will be described in detail as follows.

In FIG. 4, the body 34 has a lower skin panel 91 to which is secured a plurality of wear resisting portions 93, 94 and 95. The wear resisting portions extend longitudinally of the lower portion of the body and are secured thereto by a plurality of fasteners 97 which have threaded ends engaged in securing plates 99 embedded in the panel 91. The panel 91 can be a glass and/or fibre reinforced plastic resin and the plates 99 can be a suitable metal. It can be seen in FIG. 6 that the wear resisting portions 94 and 93, and similar wear portions on the opposite side of the axis 19, are disposed between the guide grooves of the track bed and cooperate with inner portions of the grouser bar 56. The wear resisting portion 95, and a similar wear resisting portion 96 which is adjacent the tunnel 85, cooperate similarly with outer portions of the grouser bar 56. Clearly, in operation of the vehicle, downwards force due to weight of the vehicle passes through the wear resisting portions and is sustained by the flanges 77 and 78 and the grouser bars to support weight of the vehicle as the lower portion of the crawler track bed moves over the crawler track belt assembly.

As best seen in FIG. 4, the guide groove 88 has a pair of oppositely facing sidewalls 102 and 103 which are sides of the wear resisting portions 94 and 95 and are inclined upwardly so as to have oppositely facing surfaces generally complementary to portions of the guide portion 62. In this way, a relatively narrow clearance gap 104 exists between each of the sidewalls 102 and 103 and the guide portion, so as to guide the body with respect to the grouser bar and to reduce lateral movement between the grooves and the grouser bar. Preferably, the portions 93 through 96, are formed from a low friction, wear resisting, ultra high molecular weight plastic (e.g. UHMW polyethylene), and thus wear of the wear resisting portions and the flanges is minimal. In this way, high lateral forces acting between the body and the guide portions when a vehicle traverses a side slope or turns a sharp corner can be sustained, so as to prevent excessive wear or friction in this mode. It can be seen that the plurality of wear resisting portions secured to the lower portion of the body engage the wear resisting strip i.e. the flanges 77 and 78, of the grouser bar so as to reduce wear between the track and the body and also reduce transmission of vibration into the body.

It can be seen that the lowermost portions of the vehicle body include the wear resisting portions 93, 94 and 95 on one side, and corresponding wear resisting portions on the opposite side. When the vehicle is immersed in a fluid or sinks into a soft surface, displacement volume of the vehicle body is encountered as soon as the crawler track belt becomes immersed in the fluid. This contrasts with a prior art roller supported crawler track assembly, which usually has relatively large clearance spaces between the rollers, the crawler track belt assembly, and solid portions of the vehicle body. Thus, for a given depth of immersion of the vehicle body using the crawler track assembly and track bed of the present invention, a greater volume of vehicle body is encountered than would be encountered with a prior art roller-supported crawler track belt assembly. Thus, for a given vehicle body size and weight, the present invention would displace more fluid volume initially and thus would not be immersed as deeply in the fluid or soft surface as a prior art vehicle with a wheel mounted crawler track belt. This has advantages when traversing ecologically sensitive swamp or muskeg, as the vehicle of the present invention does not sink in as deeply as a prior art vehicle of similar size and weight using free-wheeling track rollers. Thus, the present invention has improved "floatation" when compared with a similar or equivalent prior art vehicle. In some circumstances the invention can follow its own previous tracks in muskeg, which is not possible with other prior art apparatus known to the applicant.

The upper track bed portions 43 and 44, shown only in FIG. 2, are generally similar to the lower track bed portion 35 and have outer and inner guide portions, not shown, which are generally similar to the guide portions 62 and 63 of FIG. 6. Because the upper track bed portions do not sustain weight of the vehicle, but merely carry weight of the belt and tension, there is less need for a relatively large wearing area, such as that formed from the wear resisting portions 93, 94 and 95 of FIG. 4. Thus, there is no requirement for the upper track bed portion to have a longitudinally extending wear resistant portion located immediately adjacent the central longitudinal axis of the track belt assembly, and being generally similar to the wear resisting portion 93 of FIG. 4. Instead, the upper track bed portions have wear resisting portions similar to the portions 94 and 95, which define edges of the guide portions, but the additional cost and weight of a portion corresponding to the portion 93 is preferably omitted.

FIGS. 6 and 7

As previously stated, the sponsons 81 and 82 define the hull tunnel 85 therebetween which has a longitudinally extending roof 109 defining a central portion of the lower portion of the body. The sponsons provide a relatively wide base for the vehicle when traversing side slopes or irregular marginal terrain, thus greatly reducing the possibility of the vehicle rolling over inadvertently. The sponsons also provide a widely spaced buoyancy when in water, greatly reducing the chance of the vehicle inadvertently rolling upside down when floating.

As previously stated, when on water the vehicle is powered by a water jet assembly 25, which has a primary intake 112 located adjacent a vertical central longitudinal plane 113 of the vehicle and adjacent the rear of the vehicle and the roof of the tunnel. Thus, the primary intake for the water jet assembly is not located adjacent the lowest portion of the hull as in the prior art, but instead is located centrally in the tunnel roof which is generally adjacent an uppermost portion of the lower portion of the hull that is immersed. This contrasts with prior art water jet powered vessels which normally locate the intake for the water jet at the lowermost portion of the hull, thus reducing chances of air entrainment. Air entrainment can be a problem with high speed, water-jet powered, planing vessels, but with the present displacement type of vehicle air entrainment rarely presents a problem. The roof of the tunnel 109 is curved, which tends to break up sheets of ice that might be located within the tunnel, and would have a tendency of blocking the primary intake 112. Also, by positioning the primary intake at an uppermost location within the tunnel, the chance of the primary intake sucking in disturbed debris which usually accumulates near the bottom of a body of water is reduced. Thus, when traversing a relatively shallow swamp or body of water, in which the bottom usually has an accumulation of water-logged material, there is less chance of blocking the primary intake than there would be with some prior art water jet driven vessels, which have water jet intakes located near the lowermost portion of the vessel.

Notwithstanding the strategic location of the intake 112, blockage of the intake with ice blocks or other debris is possible, and thus a secondary or auxiliary intake 115 for the water jet is provided. The intake 115 has a transverse duct portion 116 which connects with a forward duct portion 117 extending from the intake 112, so that both duct portions feed into the water jet assembly. The secondary intake is located on the track bed 35 so as to be swept by center portions 69 of the grouser bars 56 of the crawler track assembly 17 as the vehicle moves. In this way, it is essentially impossible for ice to form adjacent the intake 115, even in severe freezing conditions, and thus the water jet, in all likelihood, would always have access to water. It has been found that, by use of the secondary intake, forward motion of the vehicle can be maintained in severe icing conditions, which motion also assists in reducing chances of ice building up in the primary intake. Thus, two intakes enhance performance in icing condition, because the secondary intake permits maintenance of some forward motion due to mechanical clearing of the secondary intake, and this forward motion itself assists in maintaining the primary intake also clear of ice. The intake 115 is located adjacent the gap 55 between the belt portions 51 and thus is not obstructed by the belt portions.

FIGS. 7 through 9

Referring to FIG. 7, the water jet assembly 25 has a main duct 120 which has a forward end containing the duct portion 117 and the primary intake 112, and a rear end provided with a rotatable discharge nozzle 122. A conventional reversible thrust bucket of conventional water jets is not suitable for polar travel because it is vulnerable to impact damage from ice. The rotatable nozzle used in the invention is smoothly faired into the hull and thus is relatively safe from ice damage, and also permits 360 degrees of rotation. The duct 120 contains an impeller, not shown, powered through a suitable transmission from the power unit 23 (FIG. 1 only). The nozzle 122 is mounted adjacent the tunnel roof 109, and is located rearwardly of the intake 112. The discharge nozzle has journalling means 124 for journalling the discharge nozzle for rotation about a nozzle axis 126 which is disposed within the vertical central longitudinal plane 113 (FIG. 6). A nozzle swivel shaft 127 extends upwardly from the nozzle and externally of the duct 120 and is coupled to the steering means, not shown, which are controllable by the operator.

Referring to FIG. 8, the discharge nozzle 122 resembles a truncated cone and has a nozzle duct 128 which has an entrance 129 aligned generally axially and concentrically with the axis of rotation 126. The nozzle duct also has an exit 131 which, as seen in FIG. 9, is disposed eccentrically of the axis of rotation 126, and as seen in FIG. 8, is inclined obliquely to the axis of rotation 126. In this way, rotation of the nozzle 122 swings water discharged from the nozzle obliquely relative to the axis. To reduce spiraling rotation of the water flow as it leaves the nozzle, the nozzle has a generally radially disposed flow guide vane 133, an end face of which only is shown in FIG. 9, and a generally perpendicularly disposed flow guide vane 134, best seen in section in FIG. 8. The vane 134 is on a diameter at the entrance 129 and is on a chord at the exit 131. The guide vanes 133 and 134 intersect at right angles generally adjacent the center of the duct, and also strengthen the nozzle and associated assembly.

As best seen in FIGS. 7 and 8, the axis of rotation is inclined at an angle 136 to the vertical 137, which angle is typically about 25°. As best seen in FIG. 8, the duct has an axis of discharge 138 which represents a mean centre line of a jet of water discharged from the nozzle, which is inclined obliquely at an angle 139 to the axis 126 of the nozzle. The combination of the angle 136, representing the inclination of the axis 126 to the vertical, and the angle 139, which represents the angle of oblique discharge from the nozzle, results in the jet discharge axis 138 being inclined at an angle 141 to the horizontal 140. The angles 139 and 141 are approximately 55° and 10° and thus, when the nozzle is inclined rearwardly as shown in FIG. 8, the thrust is directed essentially rearwardly, with a small downwards component.

In contrast, when the nozzle is swung through 180° so as to discharge in an opposite or forward direction, the discharge axis 138, shown in FIG. 8 in broken outline at 138.1, is inclined at an angle 142 to the horizontal. The exit 131 is shown in broken outline at 131.1 in FIG. 9 discharging forwardly. The angle 142 is approximately 60°, which provides forward and downward components of discharge of water from the nozzle. The forward component of the discharge provides reverse thrust for the vehicle, and also assists in clearing debris that might otherwise block the intake 112. As best seen in FIG. 7, when the nozzle is directed rearwardly, some fluid from the nozzle, shown as broken arrows 145, is seen to pass adjacent the intake 112, which would thus assist in clearing ice that might otherwise tend to form adjacent the primary intake 112. Clearly, if any ice had formed at the intake, little or no fluid would be entering the primary intake, and the water discharged from the nozzle would be received through the secondary intake.

Thus, in summary, the nozzle is rotatable between a rearward facing direction to discharge water rearwardly to apply a forward force to the vehicle, and a forward facing direction to discharge water forwardly and generally towards the primary water intake to assist in clearing the primary water intake. Clearly any intermediate position of the nozzle would generate a lateral force on the vehicle unit.

OPERATION

The vehicle operates in a manner generally similar to that described the reference to the applicant's U.S. Pat. No. 4,645,023, and fairly detailed recital of operation to negotiate marginal terrain is deemed unnecessary. Notwithstanding the similarity in operation between the present invention and that disclosed in the said U.S. patent, specific advantages result from the present invention. For example, in freezing conditions when the vehicle is operating in water, any tendency for ice to form adjacent the primary intake of the water jet is less of a problem as the vehicle can, if needed, obtain sufficient thrust from the secondary intake which is maintained free of obstruction by sweeping with the crawler track belt assembly. If ice forms adjacent to the primary intake, water obtained through the secondary intake can be directed by the swiveling nozzle so as to assist in clearing the primary intake.

We claim:

1. A propulsion apparatus for a vehicle, the apparatus having a crawler track belt assembly comprising:
   (a) a plurality of elongated, longitudinally extending, flexible fabric belt portions disposed parallel to each other, oppositely facing edges of some adjacent belt portions being spaced relatively closely together,
   (b) a plurality of longitudinally spaced apart grouser bars extending transversely across and secured to the belt portions, at least some of the grouser bars having guide portions at respective stations which are spaced transversely apart with respect to the belt assembly, so that the guide portions of a respective station are mutually aligned longitudinally with each other, the guide portions of the grouser bars having a pair of longitudinally aligned side faces which converge towards each other from the grouser bar to define a tapered cross-sectional shape when viewed longitudinally of the crawler track belt.

2. An apparatus as claimed in claim 1 in which:
   (a) each grouser bar mounts a plurality of spaced apart guide portions projecting from respective stations adjacent a side of the bar which is adjacent the belt portion, the guide portions of each bar being spaced apart from each other along the bar to be aligned longitudinally with guide portions of the other bars.

3. An apparatus as claimed in claim 1, in which:
   (a) the belt portions are fabricated from a high tensile flexible fabric with longitudinal reinforcement,
   (b) lateral spacing between oppositely facing edges of adjacent belt portions is considerably less than longitudinal spacing between oppositely facing edges of adjacent grouser bars,
so as to provide a relatively large surface area of belt portions when compared with the grouser bars, thus reducing overall weight of the vehicle.

4. An apparatus as claimed in claim 1 in which:
   (a) the grouser bar is generally cylindrical and has a plurality of generally flat faces in contact with the belt portions, and a cylindrical portion disposed between a pair of flat faces and the belts to receive a tooth of a drive sprocket.

5. An apparatus as claimed in claim 4 in which:
   (a) the guide portions have mounting flanges secured to the generally flat faces of the grouser bars, the mounting flanges sandwiching belt portions between the mounting flanges and the grouser bars.

6. A vehicle propulsion apparatus having:
   (a) a vehicle body having a lower crawler track bed portion adjacent a lowermost portion of the vehicle body, the track bed comprising a plurality of parallel, longitudinally extending, laterally spaced apart guide grooves recessed into the lowermost portion of the vehicle body to provide an adjacent bearing area between at least two of the grooves, the grooves being located at laterally spaced apart stations on the track bed at a track spacing,
   (b) a crawler track belt assembly comprising a plurality of elongated, longitudinally extending, flexible belt portions disposed parallel to each other, and a plurality of longitudinally spaced apart grouser bars extending transversely across and secured to the belt portions, the grouser bars mounting guide portions at respective stations which are spaced transversely apart with respect to the belt assembly, so that the guide portions of a respective station are mutually aligned longitudinally with each other, spacing between the guide portions being equal to track spacing of the track bed, so that the guide grooves receive the guide portions therein to maintain track alignment during relative movement between the vehicle body and the crawler track assembly,
   (c) the crawler track belt assembly contacting the adjacent bearing area between said two grooves of the track bed to support the belt portions and to maintain minimum clearance between the belt portions and the track bed to reduce chances of the guide portions disengaging from the guide grooves.

7. An apparatus as claimed in claim 6 in which the crawler track bed further comprises:
   (a) a plurality of wear resisting portions disposed between the guide grooves of the track bed and extending longitudinally of the lower portion of the vehicle body, downwards force from the wear resisting portions being sustained by the grouser bars to support weight of the vehicle as the lower portion of the crawler track bed moves over the track belt assembly.

8. An apparatus as claimed in claim 7 in which:
   (a) the grouser bars further include a wear strip secured thereto, on a side of the grouser bar adjacent the belt portion, so as to sandwich a portion of the belt between the wear strip and the grouser bar,
   (b) the plurality of wear resisting portions secured to the lower portion of the body to engage the wear resisting strips of the grouser bars so as to reduce wear between the belt and the body.

9. An apparatus as claimed in claim 6 in which the crawler track bed further comprises:
   (a) the plurality of grooves having a pair of oppositely facing side walls which have portions generally complementary to the side faces of the guide portions, so as to guide the body with respect to the grouser bars and to reduce lateral movement between the grooves and the grouser bars.

10. An apparatus as claimed in claim 9 in which the crawler track bed further comprises:
   (a) the side walls of the grooves being provided with a wear resisting low friction material adapted to be swept by the projections of the grouser bars.

11. An apparatus as claimed in claim 8 in which:
   (a) the wear strip is a mounting flange of the grouser bar.

12. An apparatus as claimed in claim 6 in which:
   (a) the lower portion of the crawler track bed has a profile when viewed laterally of the vehicle that resembles a catenary.

13. An apparatus as claimed in claim 12 further including:
   (a) rotatable forward and rear sprockets adapted to engage the grouser bars of the crawler track assembly, the sprockets being positioned adjacent forward and rear ends respectively of the profile which resembles the catenary.

14. An apparatus as claimed in claim 6 further including:
   (a) an intake for a water jet located in the track bed so as to be swept by the crawler track, belt assembly as the vehicle moves.

15. An apparatus as claimed in claim 6 in which:
   (a) the guide portions of the grouser bars have longitudinally aligned side faces which converge towards each other from the grouser bar to define a tapered cross-sectional shape when viewed longitudinally of the crawler track belt.

16. A crawler track-laying vehicle body having a crawler track bed comprising:
   (a) upper and lower track bed portions, the lower track bed portion having a profile when viewed laterally of the vehicle that resembles a catenary,
   (b) the lower track bed portion of the vehicle body having a pair of generally similar sponsons, the sponsons being laterally spaced apart to define a hull tunnel therebetween, the hull tunnel having a longitudinally extending roof defining a central portion of the lower track bed portion of the body,
   (c) an intake for a water jet positioned adjacent the roof.

17. A vehicle body as claimed in claim 16 further comprising:
   (a) the sponsons having respective lower surfaces to provide crawler track beds for lower runs of respective crawler track assemblies,
   (b) a secondary intake for a water jet is located in at least one of the track beds so as to be swept by the respective crawler track assembly due to relative movement between the track assembly and the vehicle body.

18. A vehicle body as claimed in claim 16 further comprising:
   (a) a water jet discharge nozzle positioned adjacent the roof and rearwardly of the water jet intake,
   (b) the discharge nozzle having journalling means for journalling the discharge nozzle for rotation so as to direct discharge of pressurized water from the nozzle, the nozzle being rotatable between a rearward facing direction to discharge water rearwardly to apply a forward force to the vehicle, and a forward facing direction to discharge water forwardly and generally towards the water intake to assist in clearing the water intake of any blockage together with applying a rearward force to the vehicle.

19. A vehicle body as claimed in claim 18 in which:
   (a) the nozzle is rotatable about an axis of rotation which is disposed within a vertical longitudinally extending plane,
   (b) the nozzle has a nozzle duct which has an entrance aligned generally axially and concentrically with the axis of rotation, and an exit disposed eccentrically and inclined obliquely to the axis of rotation, so that rotation of the nozzle swings water discharged from the nozzle obliquely relative to the axis.

20. A method of operating a water jet powered marine vehicle comprising the steps of:
   (a) providing the vehicle with a water jet assembly having primary and secondary intakes and a water jet discharge nozzle,
   (b) drawing water into the primary intake for the water jet assembly until the primary intake becomes blocked,
   (c) drawing water through the secondary intake to supply water to the water jet assembly,
   (d) directing the discharge nozzle towards the primary intake,
   (e) discharging water drawn through the secondary intake by the water jet assembly through the discharge nozzle to assist in clearing the blockage of the primary intake.

21. A crawler track-laying vehicle body having a crawler track bed comprising:
   (a) upper and lower track bed portions, the lower track bed portion having a profile when viewed laterally of the vehicle that resembles a catenary,
   (b) a crawler track belt assembly supported by the track bed
   (c) an intake for a water jet located in the track bed so as to be swept by the crawler track belt assembly as the vehicle moves.

22. A marine vessel comprising:
   (a) a body,
   (b) a water jet assembly having primary and secondary water jet intakes and a water jet discharge nozzle, the primary water jet intake being mounted on the body forwardly of the discharge nozzle,
   (c) the body having a clearance channel extending between the primary jet intake and the discharge nozzle to permit communication therebetween,
   (d) the discharge nozzle having journalling means for journalling the discharge nozzle for rotation, so as to direct discharge of pressurized water from the nozzle, the nozzle being rotatable between a rearward facing direction to discharge water rearwardly to apply a forward force to the vehicle, and a forward facing direction to discharge water forwardly through the clearance channel and generally towards the primary water intake to assist in clearing the primary water intake of blockage.

23. A vehicle as claimed in claim 22 in which:
   (a) the nozzle is rotatable about an axis of rotation which is disposed within a vertical longitudinally extending plane,
   (b) the nozzle has a nozzle duct which has an entrance aligned generally axially and concentrically with the axis of rotation, and an exit disposed eccentrically and inclined obliquely to the axis of rotation, so that rotation of the nozzle swings the water discharged from the nozzle obliquely relative to the axis.

24. A vehicle as claimed in claim 22 further characterized by:
(a) the vehicle being an amphibious crawler track laying vehicle,
(b) the body having upper and lower track bed portions,
(c) a crawler track belt assembly passing around the track bed portions, and being driven relative to the vehicle on longitudinally spaced forward and rear sprockets,
(d) the secondary water jet intake is located in at least one of the lower track beds so as to be swept by the respective crawler track bed assembly due to relative movement between the track assembly and the vehicle.

25. A method of operating an amphibious crawler track laying vehicle in water, the method comprising the steps of:
(a) providing the vehicle with a water jet and a track bed to receive a crawler track belt assembly,
(b) drawing water into an auxiliary intake for the water jet, the auxiliary intake being located on the track bed,
(c) discharging water through a rotatable jet nozzle spaced from the intake to provide propulsion for the vehicle,
(d) sweeping the auxiliary intake with the crawler track belt assembly to assist in maintaining the intake free of obstruction.

26. A method as claimed in claim 25 further comprising:
(a) drawing water into a primary intake for the water jet until the primary intake becomes blocked, the primary intake also being spaced from the nozzle,
(b) rotating the nozzle to direct water discharged therefrom generally towards the primary intake,
(c) drawing water through the secondary intake to supply water to the water jet, which can then discharge the water from the secondary intake through the nozzle to assist in clearing any blockage of the primary intake.

27. A method as claimed in claim 26 further comprising:
(a) locating the primary intake for the water jet longitudinally forwardly from the nozzle,
(b) locating the auxiliary intake for the water jet spaced laterally from the primary intake,
(c) rotating the nozzle from a rearwardly facing direction to a forwardly facing direction to discharge water forwardly and generally towards the primary intake to assist in clearing the blockage of the intake.

* * * * *